Sept. 7, 1926.

R. A. McCANN

TRICYCLE

Filed May 10, 1926

1,598,869

INVENTOR:
ROY A. McCANN,
BY
ATTORNEY

Patented Sept. 7, 1926.

1,598,869

UNITED STATES PATENT OFFICE.

ROY A. McCANN, OF LOS ANGELES, CALIFORNIA.

TRICYCLE.

Application filed May 10, 1926. Serial No. 107,946.

This invention relates to a novel design of tricycle for children.

The child's tricycle is ordinarily so designed that the rider sits very high. The center of gravity therefore is comparatively high and the tricycle will tip over quite easily. Very painful injuries have occurred especially to small children because the tricycle tips over easily.

It is an object of the invention to provide a novel tricycle which is almost impossible to tip over. I accomplish this object by providing a tricycle in which the seat is placed very low; in fact, the seat is preferably placed between the back wheels of the tricycle. For this reason the center of gravity will be very low and the danger of tipping is greatly reduced.

It is another object of this invention to provide a novel tricycle in which the rider may exert considerable propelling force, thus obtaining much power and having the ability to travel fast. This object of the invention is accomplished by placing the seat very low so that the rider's legs extend substantially horizontal to the propelling pedals. This arrangement, I find, permits much force to be exerted on the pedals which results in power and speed.

Other objects and advantages of the invention will be made evident hereinafter.

Referring to the drawing in which I illustrate my invention,

Figure 1:
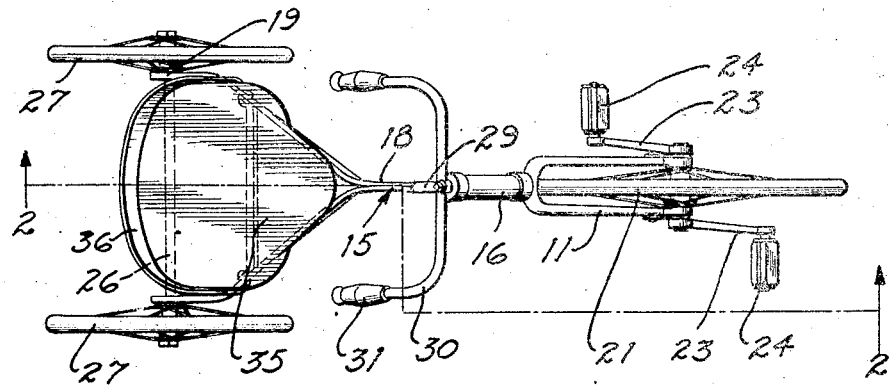
Fig. 1 is a plan view thereof.

The form of the invention shown in the drawing has a fork frame 11 which provides a fork 12 which is composed of a pair of legs, as shown. Extending from the upper end of the fork 12 is a spindle 13 of the fork frame. The fork frame 11 is inclined, as shown, at a considerable angle from vertical. The numeral 15 represents a main frame having a bearing sleeve 16 through which the spindle 13 extends, and in which the spindle is journaled. Extending from the bearing sleeve 16 is a frame proper indicated by the numeral 17. The frame proper consists mainly of a pair of legs 18, the forward parts of which are placed in contact with each other, whereas the rear ends 19 of the legs 18 are separated a considerable distance. The forward ends of the legs 18 extend from the bearing sleeve 16 substantially at right angles to the extension of the fork frame 11; therefore, the forward portion extends in a plane which approaches a vertical plane. The legs 18, however, are curved near their central parts so that the rear ends 19 thereof extend in a plane which is substantially horizontal. The rear ends of the legs 19 do, however, decline backward, as shown.

A drive wheel 21 having a shaft 22 is rotatably supported between the forward ends of the fork 12. Attached to the shaft 22 of the drive wheel 21 at each side of the fork 12 are cranks 23, to the outer ends of which foot pedals 24 are secured. A rear axle 26 extends between the rear ends 19 of the legs 18 and secured on the opposite ends of the rear axle 26 are rear wheels 27, these rear wheels 27 being situated immediately outside the rear ends 19 of the legs 18. The wheels 27 are smaller in diameter than the drive wheel 21; therefore, the rear axle 26 is in a plane which is lower than the shaft 22 of the drive wheel 21.

Extending from the upper end of the spindle 13 above the bearing sleeve 16 is a post 29, and attached to the post 29 is a handlebar 30 having handles 31 by means of which the fork frame 11 may be rotated in order to steer the tricycle.

Figure 2:
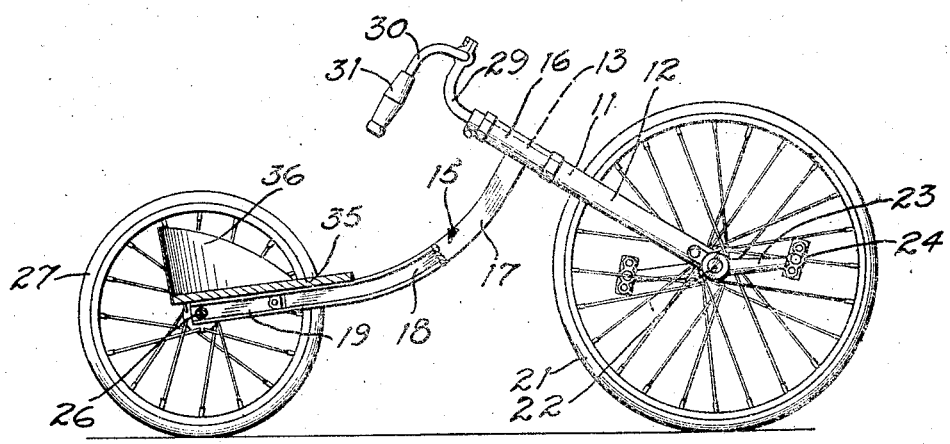
Fig. 2 is an elevation partly sectioned, this view being taken substantially as indicated by the line 2—2 of Fig. 1.

The numeral 35 represents a seat which is of a bucket type having a back 36. The seat 35 is supported by the legs 18 of the main frame 15 and, as clearly shown in Fig. 1, is placed between the rear wheels 27, and as shown in Fig. 2 is placed immediately above the rear axle 26. As will be noted from Fig. 2, the seat 35 is placed in a plane which is below the axis of rotation of the drive wheel 21, the axis of rotation being the center of the shaft 22.

One important feature of the invention is that the tricycle will not tip over because the seat 35 is placed between the rear wheels 27 and immediately above the rear axle 26. The rider will sit very low and therefore the center of gravity of tricycle and rider will be extremely low. This practically prevents the tricycle from tipping over under any conditions. The tricycle may be ridden over rough ground and over steep inclines without difficulty or danger of tipping over. Another feature of the invention is that the rider may obtain considerable power, and travel at a comparatively fast speed. This is because of the fact that the seat 35 is very low and that the rider's legs extend substantially horizontal. The handles 31 of the handle-bar 30 are in such a position that the rider may firmly brace himself and may exert considerable force on the pedals 24. The seat 35 is slightly reclined and will be very comfortable for the rider. The space between the rear wheels 27 is sufficient to permit a roomy seat 35 to be provided which also conduces to comfort. It should be understood that small details may be changed without departing from the spirit and scope of the invention. For example, the design of the frame portion might be modified, but so long as the incline is not disturbed it will not deviate from the invention.

I claim as my invention:

1. In a tricycle of the class described, the combination of: a fork frame consisting of a fork and a spindle extending from said fork, said fork member being inclined so that the fork end thereof is lowest; a main frame consisting of a sleeve in which said spindle is journaled, and legs extending from said sleeve, said legs extending down at a considerable angle near said spindle and being curved so that the ends thereof extend nearly horizontal; a drive wheel pivoted between said fork; cranks associated with said drive wheel; pedals attached to said cranks; an axle supported by the rear ends of said legs; rear wheels rotatably mounted near the opposite ends of said axle; steering means associated with said fork frame; and a seat supported at the rear ends of said legs and between said rear wheels, said seat being so positioned that the rider's legs will extend substantially horizontal to said pedals.

2. In a tricycle of the class described, the combination of: a fork frame consisting of a fork and a spindle extending from said fork, said fork member being inclined so that the fork end thereof is lowest; a main frame consisting of a sleeve in which said spindle is journaled, and legs extending from said sleeve, said legs extending down at a considerable angle near said spindle and being curved so that the ends thereof extend nearly horizontal; a drive wheel pivoted between said fork; cranks associated with said drive wheel; pedals attached to said cranks; an axle supported by the rear ends of said legs; rear wheels rotatably mounted near the opposite ends of said axle; steering means associated with said fork frame; and a seat supported at the rear ends of said legs and between said rear wheels, said seat being immediately above said axle and being in a plane which is lower than the axis of said drive wheel, said seat being so positioned that the rider's legs will extend substantially horizontal to said pedals.

3. In a tricycle of the class described, the combination of: a fork frame consisting of a fork and a spindle extending from said fork, said fork member being inclined so that the fork end thereof is lowest; a main frame consisting of a sleeve in which said spindle is journaled, and a frame proper, said frame proper having legs, the rear ends of which are separated and extend nearly horizontal; a drive wheel pivoted between said fork; cranks associated with said drive wheel; pedals attached to said cranks; an axle supported by the rear ends of said legs; rear wheels rotatably mounted near the opposite ends of said axle; steering means associated with said fork frame; and a seat supported at the rear ends of said legs and between said rear wheel, said seat being so positioned that the rider's legs will extend substantially horizontal to said pedals.

4. In a tricycle of the class described, the combination of: a fork frame consisting of a fork and a spindle extending from said fork, said fork member being inclined so that the fork end thereof is lowest; a main frame consisting of a sleeve in which said spindle is journaled, and a frame proper, said frame proper having legs, the rear ends of which are separated and extend nearly horizontal; a drive wheel pivoted between said fork; cranks associated with said drive wheel; pedals attached to said cranks; an axle supported by the rear ends of said legs; rear wheels rotatably mounted near the opposite ends of said axle; steering means associated with said fork frame; and a seat supported at the rear ends of said legs and between said rear wheels, said seat being immediately above said axle and being in a plane which is lower than the axis of said drive wheel, said seat being so positioned that the rider's legs will extend substantially horizontal to said pedals.

In testimony whereof, I have hereunto set my hand at Los Angeles, California, this 3rd day of May, 1926.

ROY A. McCANN.